March 8, 1932. L. M. WILEY 1,848,235
LAMP MOUNTING
Filed Oct. 23, 1930
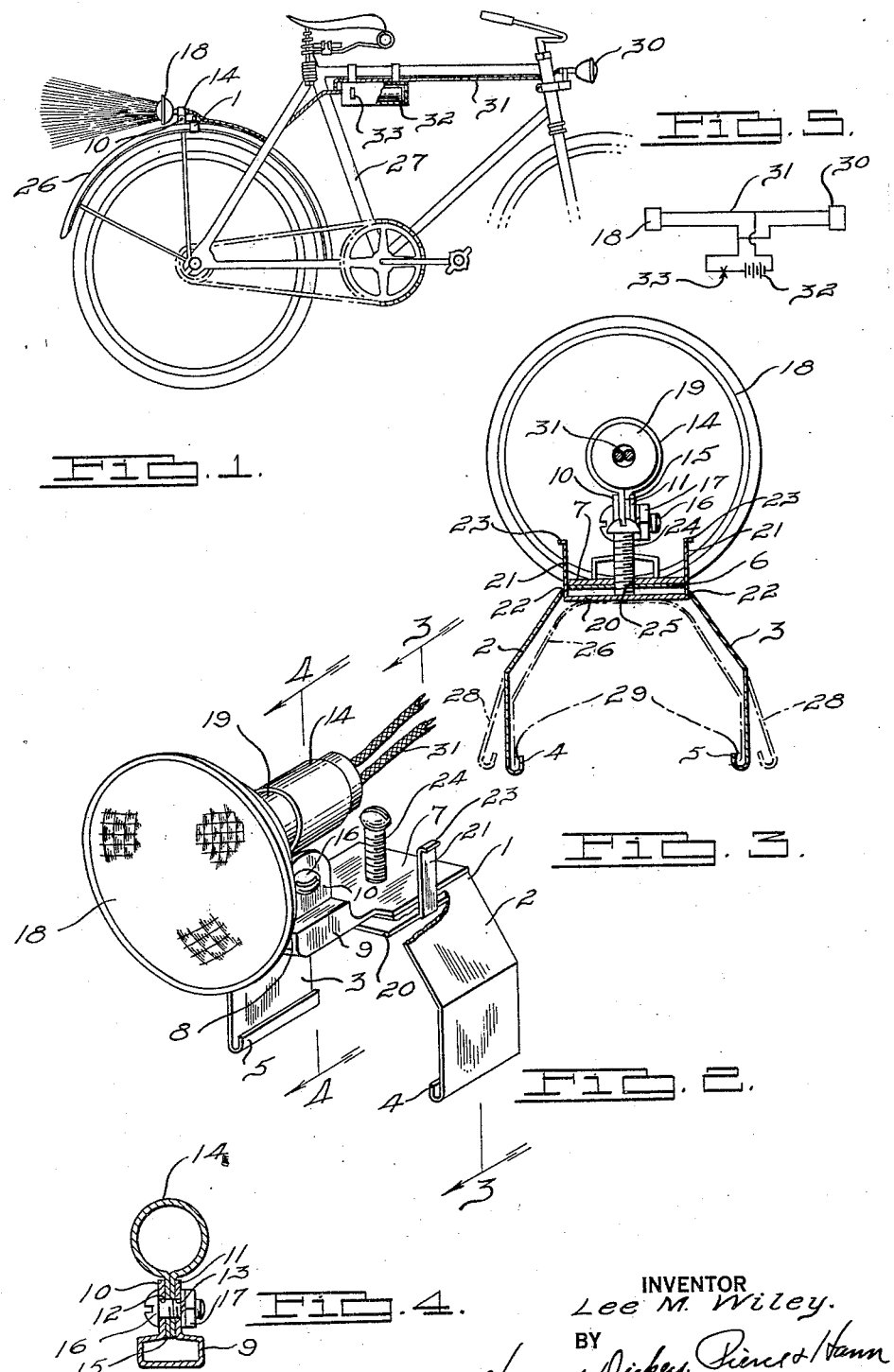
INVENTOR
Lee M. Wiley.
BY
Harness, Dickey, Pierce & Hann
ATTORNEYS.

Patented Mar. 8, 1932

1,848,235

UNITED STATES PATENT OFFICE

LEE M. WILEY, OF MARION, INDIANA, ASSIGNOR TO DELTA ELECTRIC COMPANY, A CORPORATION OF INDIANA

LAMP MOUNTING

Application filed October 23, 1930. Serial No. 490,563.

This invention relates to an improved mounting, particularly for a bicycle lamp.

The main objects of the invention are to provide a lamp mounting of this kind which is detachably securable to a mud guard of a bicycle or motorcycle, to provide an attaching bracket in a device of this character which has bendable side portions that readily conform to the contour of mud-guards of various shapes and dimensions; to provide a releasable clamping member by which the mounting may be firmly secured against displacement on a mud-guard without requiring drilling, punching or other mutilation of a mud-guard; to provide a yoke shaped attaching bracket of this kind having reversely bent edge portions which are adapted to hook onto the beaded sides of a mud-guard at any selected location, and to provide a pivotal lamp support on the mounting for allowing the lamp to be adjusted so as to direct light horizontally regardless of the location of the mounting on an arcuate mud-guard.

An illustrative embodiment of the invention is shown in the accompanying drawings, in which:

Fig. 1 is a fragmentary side elevation of a bicycle which is equipped with a tail lamp that is supported by a lamp mounting that embodies my invention.

Fig. 2 is a perspective view of the lamp and lamp mounting showing portions of the latter broken away to disclose the underlying structure.

Fig. 3 is a tranverse vertical section taken on line 3—3 of Fig. 2.

Fig. 4 is a transverse vertical section taken on line 4—4 of Fig. 2.

Fig. 5 is a diagrammatic view illustrating an electrical hook-up in which the head and tail lamps of a bicycle are connected in a circuit having a single control switch.

In the form shown the lamp mounting includes a metal bracket 1 having bendable side portions 2 and 3 on which are formed inwardly extending reversely bent flanges 4 and 5. These flanges are on the outer extremities of the side portions of the bracket and they form channels for receiving the beaded edge portions of a mud-guard or other support.

Rigidly secured to the intermediate part of the bracket 6 is a stiff reenforcing plate 7 which has a forwardly extending section 8 that protrudes in advance of the bracket. The plate 7 may be soldered, brazed, welded or otherwise integrally secured to the intermediate portion of the bracket so as to render the mid portions of the bracket substantially more rigid than the bendable sides 2 and 3 thereof.

Formed on the forward section 8 of the plate 7 is a box-like structure 9 which has upwardly extending spaced flanges or lugs 10 and 11 in which registering apertures 12 and 13 are provided. These flanges serve as supports for a lamp-receiving member which includes a ring-shaped band 14 having adjacent radial flanges 15. The flanges of the ring 14 are apertured and they are received between the lugs 10 and 11 of the box-like structure 9. A screw head bolt 16 extending through the apertures 12 and 13 of the lugs and through the apertures of the flanges 15 of the lamp receiving member forms a pivot for supporting the latter member. The lamp-receiving member may be releasably secured in a selected position by a nut 17 which is threaded on the bolt 16. A lamp 18 having a cylindrical post 19 extending through the ring 14 is held against displacement from the ring by the clamping action applied when the nut and bolt 17 and 16, respectively, are tightened.

Located below the reenforced intermediate portion of the bracket 1 is a pressure plate 20 which has a pair of upwardly extending arms 21 that project through slots 22 formed in the bracket 1 adjacent the sides of the reenforcing plate 7. These arms are provided at their extremities with outwardly extending lips 23 which are larger in dimensions than the slots 22 and which prevent displacement of the pressure plate from the bracket. A bolt 24 threaded in registering apertures 25 in the intermediate portion 6 of the bracket and reenforcing plate 7, bears upon the central portion of the pressure plate and holds the plate at a selected distance from the reenforced part of the bracket.

A lamp mounting of the above type is particularly suited for securing a tail lamp 18 on a rear fender 26 of a bicycle 27 in the manner illustrated in Fig. 1. Mountings of this kind may also be used for attaching a head lamp, not shown, to the front fender of a bicycle, if desired. The tail lamp is conveniently mounted on the rear fender 26 of the bicycle without requiring the formation of apertures in, or other mutilation of the mudguard by simply saddling the yoke shaped bracket 1 upon the latter at any selected location and bending the sides 2 and 3 of the bracket inwardly from the dotted line positions shown at 28 in Fig. 3, so as to bring the channels formed by the reversely bent end portions of the bendable sides 1 and 2 into registration with the beaded edges 29 of the mud-guard. The hooked end portions 4 and 5 of the bracket are then engaged upon the beaded edge portions 29 of the mud-guard by shifting the latter upwardly with respect to the guard. The pressure plate 20 is urged downwardly upon the top surface of the crown of the mud-guard by screwing the bolt 24 downwardly, thus clamping the pressure plate upon the mud-guard and tensioning the sides 2 and 3 of the bracket so as to secure the end portions thereof against displacement from the beaded edges 29.

A lamp mounting of this character may be readily conditioned for installation on mudguards of various shapes and dimensions by simply bending the sides of the bracket into conformity with the contour of the mudguard and adjusting the screw 24 so that the sides of the bracket are placed under tension when the hooked ends thereof are seated upon the edge portions of the mud-guard. The lamp may be readily removed or shifted in position by simply releasing the bolt 24 and unhooking the extremities of the sides of the bracket from the edges of the mud-guard. Regardless of the location of the lamp upon the arcuate shaped mud-guard the lamp may be pivotally adjusted so as to direct light rays horizontally by loosening the bolt 17 and tilting the lamp and lamp-receiving member 14, and it may be set in an adjusted position by tightening the nut thereafter. The pressure plate 20 has a substantial area which engages the crown of the mud-guard and applies only a comparatively small unit of pressure on the latter so as to obviate disfiguration of the guard.

A tail lamp of the character described may be connected in series with a head lamp 30 in a circuit 31 which includes a battery 32 and a single switch 33 by which both lamps are controlled.

Although but one specific embodiment of this invention has been herein shown and described, it will be understood that numerous details of the construction shown may be altered or omitted without departing from the spirit of this invention as defined by the following claims.

1. In combination with a crowned mudguard, a lamp mounting having a yoke-shaped bracket comprising an integral sheet metal strip saddled on said mud-guard, members on the sides of said bracket enveloping portions of the edges of said mud-guard, a releasable clamping member spreading the intermediate portion of said bracket apart from the registering surface of said mud-guard and firmly securing said bracket against displacement, and a lamp receiving element mounted on said bracket.

2. In combination with a crowned mudguard, a lamp mounting having a yoke shaped bracket comprising a flexible metal strip saddled on said mud-guard, members on the sides of said bracket envelopng portions of the edges of said mud guard, a plate rigidly attached to said bracket between the sides thereof reenforcing its intermediate portion, a releasable clamping member bearing between a surface of said mud-guard and the reenforced portion of said bracket securing said bracket against displacement, and a lamp-holding element mounted on said plate.

3. In combination with a crowned mudguard, a lamp mounting having a yoke shaped bracket saddled on said mud-guard, members on the sides of said bracket enveloping portions of the edges of said mud guard, a plate rigidly attached to said bracket between the sides thereof reenforcing its intermediate portion, a releasable clamping member bearing between a surface of said mud-guard and the reenforced portion of said bracket securing said bracket against displacement, an upright lug on said plate, and a lamp-receiving element pivotally mounted on said lug.

4. A device for mounting a lamp on a bicycle mud-guard including a yoke shaped bracket having bendable sides adapted to be spread apart diverse distances for receiving mud-guards of different shapes and dimensions, inwardly extending beads on the extremities of said sides for receiving the edge portions of a mud-guard, a plate slidably mounted on the inner side of the intermediate portion of said bracket and movable toward the open side thereof for engaging the crown portion of said mud-guard and including means for holding said plate against displacement from said bracket, a variable member on said bracket for bearing between the latter and said plate and adapted to firmly hold the beads of the sides of said bracket in interlocked relationship with the edge portions of mud-guards of different shapes and dimensions, and means on said bracket for supporting a lamp.

5. A lamp mounting including a member having reversely bent edge portions for hooking onto the edges of a support, a pressure plate located between the intermediate portion of said member and said support, arms on said pressure plate extending through slots in said member and having flanges on their extremities for preventing displacement of said pressure plate from said member, a screw threaded in said member and bearing upon said plate for tensioning the intermediate portions of said member so as to urge the reversely bent portions thereof firmly against the edges of said support, and means mounted on said member for receiving a lamp.

6. A device for mounting a lamp on a bicycle mud-guard including a yoke shaped bracket having bendable sides adapted to be spread apart diverse distances for receiving mud-guards of different shapes and dimensions, inwardly extending beads on the extremities of said sides for receiving the edge portions of a mud-guard, a movable plate located on the inner side of said bracket for engaging the crown portion of said mud-guard including arms extending through apertures in said bracket having angularly bent end portions for limiting the relative movement between the latter and said bracket so as to prevent displacement of said plate from said bracket, a variable member on said bracket for bearing between the latter and said plate and adapted to firmly hold the beads of the sides of said bracket in interlocked relationship with the edge portions of mud-guards of different shapes and dimensions, and means on said bracket for supporting a lamp.

7. In a device for mounting a lamp on a mud-guard, a yoke comprising bendable material adapted to embrace the side portions of mud-guards of diverse shapes and dimensions, a rigid plate integrally secured to the intermediate portion of said yoke for reenforcing the same, a pair of spaced flanges on said plate, a lamp support pivotally mounted between said flanges, a member co-acting with said flanges for releasably securing said support in an adjusted position, beads on the extremities of the sides of said yoke for receiving the edge portions of a mud-guard, a movable plate slidably mounted on said yoke in registration with the reenforced portion thereof for engaging the crown of a mud-guard, and a variable member threaded in an aperture in the reenforced portion of said yoke for spacing said plate at diverse distances from the latter portion of said yoke so as to firmly clamp said yoke on mud-guards of different shapes and dimensions.

8. In combination with a mudguard, a lamp mounting including a yoke shaped bracket, members on the extremities of said bracket enveloping the edges of said mudguard, a member threaded in the intermediate portion of said bracket and a pressure plate bearing between said threaded member and the crown portion of said mudguard having means engageable with said bracket for independently holding said pressure plate against displacement from said bracket, and a lamp receiving element mounted on said bracket.

9. In combination with a crowned mudguard, a lamp mounting having a yoke shaped bracket comprising resilient sheet metal saddled on said mudguard, the sides of said bracket being normally sprung outwardly with respect to the sides of said midguard when released, members on the sides of bracket enveloping portions of the edges of said mudguard, a releasable clamping member bearing between said mudguard and the intermediate part of said bracket for holding the sides of said bracket and the members thereon in contact with the sides and edges of said mudguard respectively so as to firmly secure said bracket against displacement, at any selected location on said mudguard without requiring drilling or other mutilation of the latter and a lamp receiving element mounted on said bracket.

LEE M. WILEY.